(12) United States Patent
Hanusa et al.

(10) Patent No.: US 9,452,589 B2
(45) Date of Patent: Sep. 27, 2016

(54) COMPOSITE BASALT FABRIC TENT LINER

(71) Applicant: AA Technology LLC, Lafayette, IN (US)

(72) Inventors: Lotar Hanusa, Pittsburgh, PA (US); Maung Aye Than, Lafayette, IN (US)

(73) Assignee: AA Technology LLC, Lafayette, IN (US)

( * ) Notice: Subject to any disclaimer, the term of this patent is extended or adjusted under 35 U.S.C. 154(b) by 338 days.

(21) Appl. No.: 14/017,616

(22) Filed: Sep. 4, 2013

(65) Prior Publication Data

US 2014/0065332 A1 Mar. 6, 2014

Related U.S. Application Data

(60) Provisional application No. 61/696,959, filed on Sep. 5, 2012.

(51) Int. Cl.

| | |
|---|---|
| *B32B 5/26* | (2006.01) |
| *B32B 5/02* | (2006.01) |
| *B32B 7/02* | (2006.01) |
| *B32B 1/08* | (2006.01) |
| *B32B 5/22* | (2006.01) |
| *B32B 5/24* | (2006.01) |
| *B32B 5/06* | (2006.01) |
| *B32B 7/12* | (2006.01) |
| *B32B 27/12* | (2006.01) |
| *B32B 27/34* | (2006.01) |
| *B32B 27/36* | (2006.01) |
| *F41H 5/04* | (2006.01) |
| *E04H 15/54* | (2006.01) |

(52) U.S. Cl.
CPC . *B32B 5/26* (2013.01); *B32B 1/08* (2013.01); *B32B 5/022* (2013.01); *B32B 5/024* (2013.01); *B32B 5/028* (2013.01); *B32B 5/06* (2013.01); *B32B 5/22* (2013.01); *B32B 5/24* (2013.01); *B32B 7/02* (2013.01); *B32B 7/12* (2013.01); *B32B 27/12* (2013.01); *B32B 27/34* (2013.01); *B32B 27/36* (2013.01); *E04H 15/54* (2013.01); *F41H 5/0471* (2013.01); *F41H 5/0485* (2013.01); *B32B 2255/02* (2013.01); *B32B 2255/26* (2013.01); *B32B 2262/10* (2013.01); *B32B 2307/304* (2013.01); *B32B 2307/3065* (2013.01); *B32B 2307/718* (2013.01); *B32B 2571/00* (2013.01); *B32B 2571/02* (2013.01); *Y10T 428/13* (2015.01); *Y10T 428/1362* (2015.01); *Y10T 428/1366* (2015.01); *Y10T 428/1393* (2015.01); *Y10T 428/24942* (2015.01); *Y10T 442/191* (2015.04); *Y10T 442/30* (2015.04); *Y10T 442/3431* (2015.04); *Y10T 442/3707* (2015.04)

(58) Field of Classification Search
CPC ......... B32B 5/022; B32B 5/024; B32B 5/22; B32B 5/24; B32B 5/26; Y10T 428/1393; Y10T 428/1362; Y10T 428/1366
See application file for complete search history.

(56) References Cited

U.S. PATENT DOCUMENTS

| | | | |
|---|---|---|---|
| 4,956,218 A | 9/1990 | Haining | |
| 5,167,876 A * | 12/1992 | Lem | ......... B32B 5/12 252/602 |
| 5,421,128 A | 6/1995 | Sharpless et al. | |
| 5,735,083 A | 4/1998 | Brown et al. | |
| 7,523,765 B2 * | 4/2009 | Quigley | ......... E21B 17/20 138/123 |
| 8,568,853 B2 * | 10/2013 | Raghavendran | ......... B32B 5/12 428/105 |
| 2011/0136401 A1 | 6/2011 | Hanusa et al. | |

\* cited by examiner

*Primary Examiner* — Walter B Aughenbaugh
(74) *Attorney, Agent, or Firm* — The Webb Law Firm

(57) ABSTRACT

A composite liner includes first and second basalt fabric layers with at least one of the first and second basalt fabric layers formed from woven basalt fibers. The composite liner further includes a core positioned between the first and second basalt fabric layers, where the first and second basalt fabric layers are secured to the core.

9 Claims, 2 Drawing Sheets

COMPOSITE BASALT FABRIC TENT LINER

The present application claims the benefit of U.S. Provisional Application Ser. No. 61/696,959, filed Sep. 5, 2012, the entire disclosure of which is hereby incorporated by reference.

BACKGROUND OF THE INVENTION

1. Field of the Invention

The present invention is directed to a tent liner and, more particularly, to a composite basalt fabric tent liner and protective composite basalt blanket.

2. Description of Related Art

Large tents are used by military personnel for troop deployment and serve a variety of functions, including use as command posts, barracks, and kitchens. These tents generally must meet certain ratings for fire resistance. The materials or chemicals typically used to meet the fire resistance ratings, however, give off toxic gases containing halogen and phosphorus. Also, the materials used in the construction of the tents also give off smoke and typically melt and drip when exposed to fire. Further, air-filled supports are frequently used in tent construction. Fire damage to these air-filled supports could result in a total collapse of the tent. U.S. Pat. Nos. 5,421,128 and 5,735,083 disclose air-filled supports or air beam structures and are each hereby incorporated by reference in their entirety.

Fire blankets are used to protect a user from fire-related injuries and are also utilized as fire extinguishing devices by smothering fires. Furthermore, fire blankets are also utilized to protect structures and other property in addition to protecting a person.

SUMMARY OF THE INVENTION

In one embodiment, a composite liner includes first and second basalt fabric layers with at least one of the first and second basalt fabric layers formed from woven basalt fibers. The composite liner further includes a core positioned between the first and second basalt fabric layers, where the first and second basalt fabric layers are secured to the core.

The liner may be embodied as a protective blanket. The core may be a basalt mat core. The core may also comprise reflective foil. One of the first and second basalt fabric layers may be non-woven basalt scrim. At least one of the first and second basalt fabric layers may be a woven basalt fabric having a weight of about 12-19 oz./yd. sq. The liner may further include a layer of tent material secured to the composite liner. The core may include a synthetic fiber thermal insulation core. The first and second basalt fabric layers may be a woven basalt fabric having a weight of about 12-19 oz./yd. sq., with the core being a basalt mat core. The first and second basalt fabric layers may be a woven basalt fabric having a weight of about 12-19 oz./yd. sq., with the core comprising reflective foil.

In another embodiment, a composite tent liner includes a sleeve defining an interior space configured to receive an air-filled support of a tent structure. The sleeve includes first and second basalt fabric layers with at least one of the first and second basalt fabric layers formed from woven basalt fibers. The sleeve also includes a core positioned between the first and second basalt fabric layers, where the first and second basalt fabric layers are secured to the core. The sleeve may be cylindrical in shape. The composite tent liner may further include an air-filled support received within the interior space of the sleeve.

DESCRIPTION OF THE PREFERRED EMBODIMENTS

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific arrangements illustrated in the accompanying drawing figures and described herein are simply exemplary and should not be considered as limiting.

Figure 1:
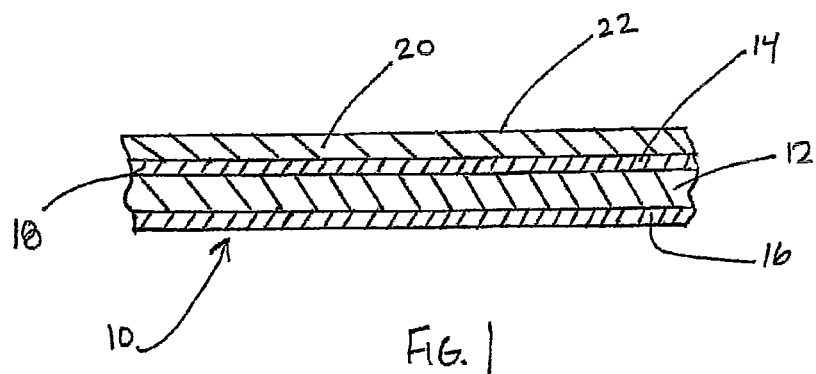
FIG. 1 is a partial cross-sectional view of a liner or blanket according to one embodiment of the present invention.

Referring to FIG. 1, one embodiment of a liner 10 includes a basalt mat core 12 and first and second layers of basalt fabric 14, 16 positioned on opposite sides of the basalt mat core 12. The first and second layers of basalt fabric 14, 16 are adhered to or attached to the basalt mat core 12. The teem "attached" refers to any arrangement of forming a bond so that layers of basalt fabric 14, 16 cannot be easily peeled or separated from the basalt mat core 12. The first and second layers of basalt fabric 14, 16 may be formed from woven layers of basalt, such as the woven basalt fabric commercially available from Textile Solutions Holding, and in the range of about 12-19 oz./yd. sq., although other suitable weight basalt fabrics may be utilized. One or both of the basalt fabric layers 14, 16 may also be formed from non-woven basalt veil or scrim. The basalt mat core 12 may be formed from basalt mat or felt that generally includes basalt fibers that are mechanically formed into mats of varying thicknesses, such as the felt mats sold by Basalt Specialty Products Inc. The first and second layers of basalt fabric 14, 16 may be attached to the basalt mat core 12 via stitching, using a film adhesive, an epoxy, a water-based adhesive, or any other suitable adhesives. The stitching may be fiberglass, Kevlar® fiber, or Nomex® fiber thread, although other suitable thread for the stitching may be utilized. Examples of suitable film adhesives include polyester adhesive films (PAF series), which are commercially available from Adhesive Films, Inc. More specifically, the PAF 110 and PAF 130 polyester adhesive films from Adhesive Films, Inc. may be suitable. Very thin, flexible urethane films and high temperature nylon-based films may also be utilized. An example of a suitable water-based adhesive is the DS 7000 series adhesive from Collano Adhesives in Switzerland.

Referring again to FIG. 1, in a particular embodiment, the liner 10 is positioned adjacent to an inner surface 18 of tent material 20 used to construct a tent. The liner 10 may be used to cover the entire inner surface 18 of the tent material 20 forming the tent, although the liner 10 may also be positioned adjacent to an outer surface 22 of the tent material 20. The liner 10 is loosely secured to the tent material 20 via any suitable fastening arrangement. The liner 10 may be stitched to the tent material 20 or may be attached to the tent material 20 using an adhesive, such as a film adhesive, a two-component epoxy, a water-based adhesive, or other suitable adhesive. The liner 10 may also be secured to the tent material 20 using any other suitable mechanical fastening arrangement, such as riveting, tying with rope, etc. The liner 10 may be formed integrally with the tent material 20 or may be formed separately and subsequently attached to the tent.

Although the embodiment of the liner 10 discussed above includes two layers of basalt fabric 14, 16 and the basalt mat core 12, other arrangements for the liner 10 may be utilized. For example, the liner 10 may be formed from one or more layers of basalt fabric without the basalt mat core 12. The basalt mat core 12 of the liner 10 may be a reflective foil core with two layers of basalt fabric positioned on opposite sides of the reflective foil core. Further, the basalt mat core 12 of the liner 10 may also be formed from a synthetic fiber thermal insulation core with two layers of basalt fabric positioned on opposite sides of the synthetic fiber thermal insulation core. The synthetic fiber thermal insulation used for the core may be THINSULATE® fiber sold by 3M Corporation.

Figure 2:
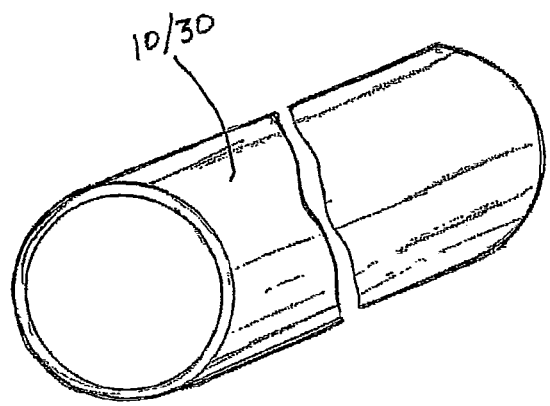
FIG. 2 is a perspective view of a liner according to a second embodiment of the present invention.
Figure 3:
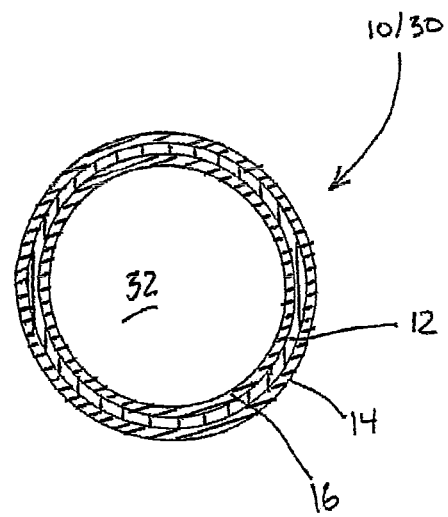
FIG. 3 is a cross-sectional view of the liner shown in FIG. 2.
Figure 4:
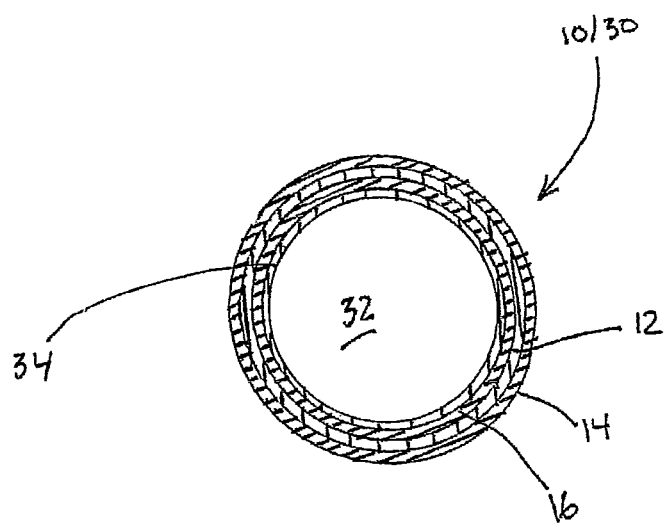
FIG. 4 is a cross-sectional view of the liner shown in FIG. 2, showing the liner positioned around an air-filled support.

Referring to FIGS. 2-4, the liner 10, discussed above and shown in FIG. 1, is embodied as a sleeve 30. The sleeve 30 is generally cylindrical and defines an interior space 32 that is sized and shaped to receive an air-filled support 34 used in the construction of tents. In particular, the sleeve 30 is configured to surround the air-filled support 34. Such air-filled supports 34 are utilized to establish a tent structure (not shown) and a fire within the tent structure could cause the air-filled support 34 to collapse. The sleeve 30 and air-filled support 34 are not drawn to scale with the size of the sleeve 30 being illustrated larger for clarity. The sleeve 30 surrounds the air-filled support 34 and is configured to protect the air-filled support 34 from fire damage. The sleeve 30 may sufficiently protect the air-filled support 34 from damage thereby maintaining the structural integrity of the tent structure until the fire can be extinguished or until the tent structure can be evacuated. The sleeve 30 may include any of the liner configurations discussed above.

During testing, the liner 10 with thin layers of basalt fabric 14, 16, with or without a basalt mat core 12, has unexpectedly been found to protect the tent material 20 from damage, even from very intense fire. Further, the liner 10 with layers of basalt fabric 14, 16, with a fiber core that would otherwise melt or combust, has unexpectedly been found to protect the tent material 20 from damage, even from very intense fire. The liner 10 has been found to protect the interior contents of a tent from damage even from an exterior fire that totally consumes the tent material. Although the liner 10 is discussed above in connection with tents, the liner 10 may also be used to protect fire fighting stations, equipment, or used as an emergency protective shelter during a forest fire. In particular, the liner 10 can also be used as external protection and function as a blanket. The liner 10 can be used as an external blanket to protect other objects, such as tents, temporary structures, or permanent structures or buildings, from potential fires. In contrast to conventional fire-resistant materials or chemical treatments of materials, the liner 10 generates little to no smoke or hazardous combustion products. In addition to its fire-resistance properties, the liner 10 also has thermal insulating and sound absorption properties. Accordingly, the liner 10 protects tents from incidental fire and increases time to extinguish fires in and around the tent structure. The liner 10 also protects air-filled supports 34 from being damaged and resulting in collapse of the tents.

This invention has been described with reference to the preferred embodiments. Obvious modifications and alterations will occur to others upon reading and understanding the preceding detailed description. It is intended that the invention be construed as including all such modifications and alterations.

The invention claimed is:

1. A composite tent liner comprising:
   a sleeve defining an interior space configured to receive an air-filled support of a tent structure, the sleeve comprising:
      first and second basalt fabric layers, at least one of the first and second basalt fabric layers formed from woven basalt fibers; and
      a core positioned between the first and second basalt fabric layers, wherein the first and second basalt fabric layers are secured to the core; and
   an air-filled support received within the interior space of the sleeve.

2. The composite tent liner of claim 1, wherein the sleeve is cylindrical in shape.

3. The composite liner of claim 1, wherein the core comprises a basalt mat core.

4. The composite liner of claim 1, wherein the core comprises a reflective foil.

5. The composite liner of claim 1, wherein at least one of the first and second basalt fabric layers comprises a woven basalt fabric having a weight of about 12-19 oz./yd. sq.

6. The composite liner of claim 1, wherein the core comprises a synthetic fiber thermal insulation core.

7. The composite liner of claim 1, wherein the first and second basalt fabric layers comprise a woven basalt fabric having a weight of about 12-19 oz./yd. sq., and wherein the core comprises a basalt mat core.

8. The composite liner of claim 1, wherein the first and second basalt fabric layers comprise a woven basalt fabric having a weight of about 12-19 oz./yd. sq., and wherein the core comprises reflective foil.

9. A composite tent liner comprising:
   a sleeve defining an interior space configured to receive an air-filled support of a tent structure, the sleeve comprising:
      first and second basalt fabric layers, at least one of the first and second basalt fabric layers formed from woven basalt fibers; and
      a core positioned between the first and second basalt fabric layers, wherein the first and second basalt fabric layers are secured to the core, wherein one of the first and second basalt fabric layers comprises non-woven basalt scrim.

* * * * *